United States Patent
Kurtz

(10) Patent No.: US 7,516,668 B2
(45) Date of Patent: Apr. 14, 2009

(54) SILICON CARBIDE PIEZORESISTIVE PRESSURE TRANSDUCER AND METHOD OF FABRICATION

(75) Inventor: Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/478,287

(22) Filed: Jun. 29, 2006

(65) Prior Publication Data

US 2008/0011087 A1     Jan. 17, 2008

(51) Int. Cl.
*G01L 9/06* (2006.01)
(52) U.S. Cl. .......................................... 73/721; 73/727
(58) Field of Classification Search .................. 73/700, 73/721, 727
See application file for complete search history.

(56) References Cited

U.S. PATENT DOCUMENTS

| | | | | |
|---|---|---|---|---|
| 4,672,354 A * | 6/1987 | Kurtz et al. | ..................... | 338/4 |
| 5,165,283 A | 11/1992 | Kurtz et al. | | |
| 5,473,944 A * | 12/1995 | Kurtz et al. | ..................... | 73/704 |
| 5,549,006 A | 8/1996 | Kurtz | | |
| 5,614,678 A * | 3/1997 | Kurtz et al. | ..................... | 73/727 |
| 6,034,001 A | 3/2000 | Shor et al. | | |
| 6,327,911 B1 | 12/2001 | Kurtz et al. | | |
| 6,689,669 B2 | 2/2004 | Kurtz et al. | | |
| 6,691,581 B2 * | 2/2004 | Kurtz et al. | ..................... | 73/754 |
| 6,900,108 B2 | 5/2005 | Kurtz et al. | | |
| 2002/0029638 A1 * | 3/2002 | Kurtz et al. | ..................... | 73/715 |
| 2003/0107096 A1 * | 6/2003 | Kurtz et al. | ................. | 257/414 |

* cited by examiner

*Primary Examiner*—Andre J Allen
(74) *Attorney, Agent, or Firm*—The Plevy Law Firm

(57) ABSTRACT

A high temperature pressure transducer is fabricated from silicon carbide. A wafer of silicon carbide has reduced or active areas which act as deflecting diaphragms. Positioned on the reduced or active area is a silicon carbide sensor. The sensor is secured to the silicon carbide wafer by a glass bond. The pressure transducer is fabricated by first epitaxially growing a layer of highly N-doped 3C silicon carbide on a first silicon wafer or substrate. A second wafer of silicon carbide is selected to be a carrier wafer. The carrier wafer is etched preferentially to produce the deflecting members or reduced areas which serve as diaphragms. The 3C material on the silicon slice is patterned appropriately to provide a series of individual piezoresistors which then may be interconnected to form a Wheatstone bridge. The two wafers are joined together using a high temperature glass frit, such as a pyroceram, with the various resistor elements appropriately placed over the deflecting members of the silicon carbide wafer. The silicon on the silicon wafer is removed and various metallic contacts and interconnects are formed on the 3C silicon carbide resistor network.

10 Claims, 1 Drawing Sheet

US 7,516,668 B2

SILICON CARBIDE PIEZORESISTIVE PRESSURE TRANSDUCER AND METHOD OF FABRICATION

FIELD OF THE INVENTION

This invention relates to high temperature pressure transducers and more particularly to a pressure transducer fabricated from silicon carbide and methods for fabricating the same.

BACKGROUND OF THE INVENTION

There has been a continuous need for providing high temperature operation in regard to pressure transducers. Such pressure transducers capable of operating at high temperatures while further being of small physical dimensions are extremely desirable for use in many areas. Cognizant of the problem the assignee herein, Kulite Semiconductor Products Inc., has developed and fabricated high temperature transducers from silicon carbide (SiC). Silicon carbide, as one can ascertain, can operate at temperatures well above 600° C. where conventional transducers, such as silicon devices undergo plastic deformation at such temperatures, rendering the devices relatively useless. Thus, the use of silicon carbide in pressure transducers is illustrated in U.S. Pat.No. 5,165,283 entitled "High Temperature Transducers and Methods of Fabricating the Same Employing Silicon Carbide" issued on Nov. 24, 1992 to A. D Kurtz et al and assigned to the assignee herein.

In further pursuing the development of such devices, the assignee herein has disclosed other silicon carbide pressure transducers capable of operating at high temperatures, see U.S. Pat. No. 5,549,006 entitled "Temperature Compensated Silicon Carbide Pressure Transducer and Methods for Making the Same" issued on Aug. 27, 1996. As one can ascertain, there are many ways of fabricating silicon carbide transducers and such techniques are further illustrated in U.S. Pat. No. 6,034,001 entitled "Methods for Etching of Silicon Carbide Semiconductor Using Selective Etchings of Different Conductivity Types" issued on Mar. 7, 2000 to A. D. Kurtz et al and assigned to the assignee herein. In that patent, there are disclosed methods for selective conductive etching of a silicon carbide semiconductor utilizing hydrofluoric acid (HF) as well as other techniques.

U.S. Pat. No. 6,327,911 entitled "High Temperature Pressure Transducer Fabricated from Beta Silicon Carbide", U.S. Pat. No. 6,689,669 entitled "High Temperature Sensors Utilizing Doping Controlled, Dielectrically Isolated Beta Silicon Carbide (SiC) Sensing Elements On A Specifically Selected High Temperature Force Collecting Membrane", U.S. Pat. No. 6,900,108 entitled "High Temperature Sensors Utilizing Doping Controlled, Dielectrically Isolated Beta Silicon Carbide (SiC) Sensing Elements On A Specifically Selected High Temperature Force Collecting Membrane" issued on May 31, 2005 to A. D. Kurtz et al, and U.S. Pat. No. 6,691,581 entitled "Pressure Transducer Fabricated From Beta Silicon Carbide" issued on Feb. 17, 2004 to A. D. Kurtz et al further disclose high temperature pressure transducers using silicon carbide or beta silicon carbide sensing elements. Pursuant to the above, one can see that there are many methods of fabricating silicon carbide transducers. These methods further include fabricating dielectrically isolated transducers utilizing various techniques.

As is known and indicated in the above-noted patents, such techniques enable one to provide silicon carbide transducers capable of operating at temperatures well in excess of 600° C.

For example, reference is made to U.S. Pat. No. 6,691,581 entitled "Pressure Transducer Fabricated from Beta Silicon Carbide" issued on Feb. 17, 2004 to A. D. Kurtz et al. This patent shows a method for fabricating a dielectrically isolated silicon carbide high pressure transducer. The method comprises applying a layer of beta silicon carbide of a first conductivity on a first substrate of silicon. A layer of beta silicon carbide of a second conductivity is then formed on a second substrate. A layer of silicon is sputtered, evaporated or otherwise formed on the silicon carbide surfaces of each of the substrates of the beta silicon carbide. The sputtered silicon layer on each substrate is then completely oxidized forming a layer of silicon dioxide from the silicon. The first and second substrates are fusion bonded together along the oxide layers of the first and second substrates, with the oxide layer providing dielectric isolation. As one can ascertain, this is a desirable method, but requires extensive processing steps. See U.S. Pat. No. 6,900,108 entitled "High Temperature Sensors Utilizing Doping Controlled, Dielectrically Isolated Beta Silicon Carbide Sensing Elements On A Specifically Selected High Temperature Force Collecting Membrane" issued on May 31, 2005 to A. D. Kurtz et al and assigned to the assignee herein. That patent shows structures and techniques to fabricate high temperature devices, such as piezoresistive sensors. One employs crystalline doped silicon carbide which is dielectrically isolated from the substrate. The devices are formed by processes that include bonding a pattern wafer to a substrate wafer, selective oxidation or removal of the undoped silicon and conversion of doped silicon to crystalline silicon carbide. The level of doping and the crystalline structure of the silicon carbide can be selected according to desired properties. This technique involves converting a doped layer of silicon to crystalline silicon carbide. It also produces a high temperature transducer according to the processes described therein.

U.S. Pat. No. 6,689,669 issued on Feb. 10, 2004 and entitled "High Temperature Sensors Utilizing Doping Controlled Dielectrically Isolated Beta Silicon Carbide Sensing Elements On A Specifically Selected High Temperature Force Collecting Membrane" shows the formation of a high temperature transducer where a first substrate wafer of silicon carbide has a layer of silicon dioxide formed on a surface. A second wafer of silicon is then employed. The second wafer is doped to enable conversion of the doped surface into a layer of silicon carbide of a targeted resistivity. The first wafer is bonded to the second wafer with a layer of silicon carbide of the first substrate contacting the doped surface of the second wafer where the bond is formed between the doped surface and the silicon dioxide layer. One then removes all of the silicon from the pattern wafer, thus leaving the doped silicon layer bonded to the oxide layer secured to the silicon carbide wafer, and then converts the doped silicon surface to silicon carbide to provide a surface of silicon carbide capable of being processed into a semiconductor device. As one can ascertain, that patent shows many necessary steps for processing silicon and silicon carbide. Reference again is made to U.S. Pat. No. 6,327,911 entitled "High Temperature Pressure Transducer Fabricated from Beta Silicon Carbide" issued on Dec. 11, 2001 to A. D. Kurtz et al. That patent shows a high temperature pressure transducer which employs dielectrically isolated beta silicon carbide pressure sensing elements situated on a diaphragm, and also fabricated from beta silicon carbide.

The dielectrically isolated pressure sensing elements are formed on the diaphragm in a method which employs two separately fabricated wafers that are later bonded together. This again is an analogous technique but requires many more steps and is a more expensive operation. That patent further discloses a technique that requires first depositing a diaphragm layer of beta silicon carbide on the surface of a first substrate which is a silicon substrate. One then forms a dielectric layer over the diaphragm layer of the beta silicon carbide. A piezoresistive Wheatstone bridge is then fabricated on a second substrate, the piezo sensing element comprising beta silicon carbide. One mounts the sensing element to the dielectric layer wherein at least one piezoresistive sensing element is dielectrically isolated from the diaphragm and then removes a portion of the second substrate so that the piezoresistive sensing element is exposed and one then removes a portion of the first substrate to form a flexible diaphragm.

The process used according to an aspect of the present invention is a simpler process to produce high temperature devices from silicon carbide. An improved silicon carbide pressure transducer and a technique for fabricating the same is described herein. Such a device is capable of high temperature operation is economical to fabricate and may be manufactured to be of extremely small dimensions.

SUMMARY

A method for fabricating a high temperature pressure transducer, comprising the steps of epitaxially growing a layer of silicon carbide on a surface of a silicon wafer, forming at least one thin deflecting area on a wafer of silicon carbide, the deflecting area operative as a pressure diaphragm, fabricating at least one piezoresistive element from the layer of silicon carbide on the surface of the silicon wafer, glass bonding the surface of the silicon wafer containing the at least one piezoresistive element to the surface of the silicon carbide wafer such that the piezoresistive element overlies the diaphragm to form a composite member, and removing all of the silicon from the composite member to provide a pressure transducer having a wafer of silicon carbide with a deflecting region and having at least one piezoresistive silicon carbide sensor glass bonded to the silicon carbide wafer at the deflecting region.

In one embodiment, a high temperature pressure transducer is fabricated from silicon carbide. A wafer of silicon carbide has reduced or active areas which act as deflecting diaphragms. Positioned on the reduced or active area is a silicon carbide sensor. The sensor is secured to the silicon carbide wafer by a glass bond. The pressure transducer is fabricated by first epitaxially growing a layer of highly N-doped 3C silicon carbide on a first silicon wafer or substrate. A second wafer of silicon carbide is selected to be a carrier wafer. The carrier wafer is etched preferentially to produce the deflecting members or reduced areas which serve as diaphragms. The 3C material on the silicon slice is patterned appropriately to provide a series of individual piezoresistors which then may be interconnected to form a Wheatstone bridge. The two wafers are joined together using a high temperature glass frit, such as a pyroceram, with the various resistor elements appropriately placed over the deflecting members of the silicon carbide wafer. The silicon on the silicon wafer is removed and various metallic contacts and interconnects are formed on the 3C silicon carbide resistor network.

DETAILED DESCRIPTION OF PREFERRED EMBODIMENTS OF THE INVENTION

Figure 1:
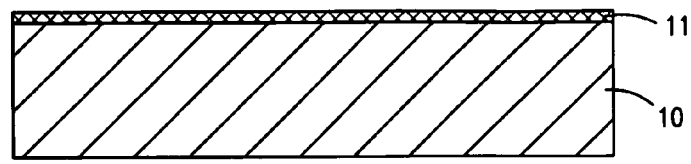
FIG. 1 is a cross-sectional view of the silicon wafer having deposited on a top surface thereof a layer of silicon carbide.

Referring to FIG. 1, there is a shown a first step in a new method for making silicon carbide piezoresistive pressure transducers. As seen from FIG. 1, a silicon wafer or substrate 10 has epitaxially grown on the top surface thereof a layer of highly doped N-doped 3C silicon carbide. The layer 11 of silicon carbide is epitaxially grown on the silicon substrate 10. The 3C silicon carbide layer is on the order of about one mil to a fraction of a mil in thickness. The wafer 10 is referred to as a sacrificial wafer.

Figure 2:
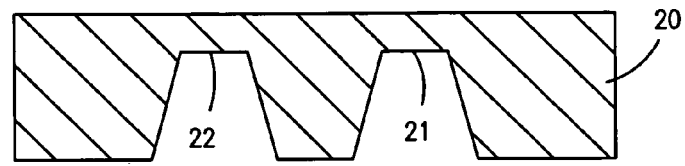
FIG. 2 is a cross-sectional view of a carrier wafer fabricated from silicon carbide and having diaphragm portions.

Referring to FIG. 2, there is shown a second wafer of silicon carbide 20. The wafer of silicon carbide 20 is designated as a carrier wafer. This carrier wafer may be comprised of polycrystalline or single crystal silicon carbide, which is either 6H, 4H, 3C or other poly types. The carrier wafer is preferentially etched to produce a series of deflecting areas as 21 and 22. These areas are thin compared to the thickness of the wafer 20 and act as deflecting diaphragms. The etching of silicon carbide to produce deflecting diaphragms or reduced thickness wafer areas is well known.

Figure 3:
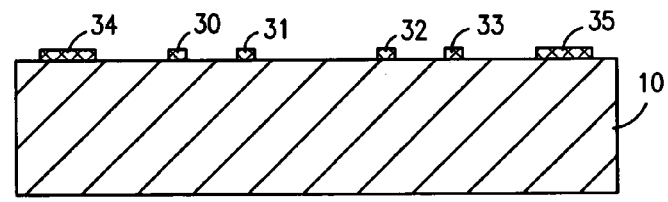
FIG. 3 is a cross-sectional view of the processed wafer of FIG. 1 using the layer of silicon carbide to form piezoresistive sensor and contact areas.

Referring to FIG. 3, the silicon carbide wafer 10 is then patterned to form a series of individual resistors which may be then interconnected to form a series of Wheatstone bridges. Essentially the process described in FIGS. 1-5 depicts a single transducer. However, by using conventional photolithographic techniques, multiple transducers are formed on a single wafer. As one can see from FIG. 3, piezoresistive elements 30, 31, 32 and 33 can be interconnected as is well known to form a Wheatstone bridge. On the left and right side of the substrate are formed contact areas 34 and 35. These contact areas enable one to deposit contacts so that the bridge array on the wafer 10 is interconnected to form a typical Wheatstone bridge.

Figure 4:
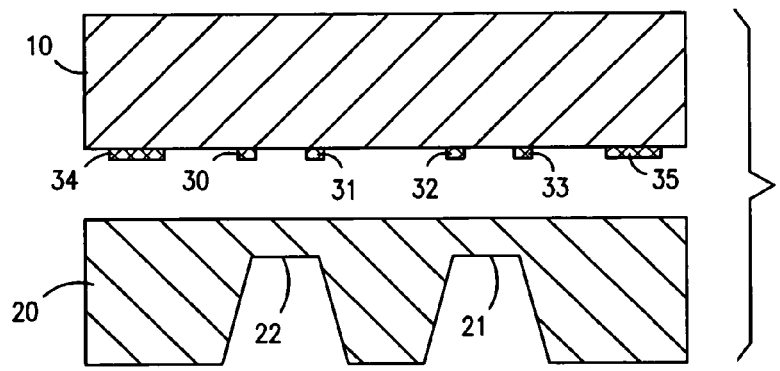
FIG. 4 is a cross-sectional view depicting the wafers of FIG. 1 and FIG. 2 positioned above the other and about to be bonded together by means of a glass bond.

Referring to FIG. 4, there is shown the sacrificial wafer 10 having piezoresistive elements 30 positioned above the carrier wafer 20. The two wafers are bonded or joined together using a high temperature glass frit such as pyroceram. The bonding occurs with the various resistor elements as 30 and 31 and so on appropriately placed over the deflecting areas 21 and 22 of the carrier substrate 20. Pyroceram itself will serve to dielectrically isolate the piezoresistors from the carrier wafer. If additional dielectric isolation is required, an adequate silicon oxide layer can be deposited or formed on either or both of the wafers prior to them being glass bonded together. The silicon on the sacrificial wafer 10 is then removed and metallic contacts and interconnects are formed on the 3C silicon carbide resistor network. The wafer is then cut to yield individual transducer structures.

Figure 5:
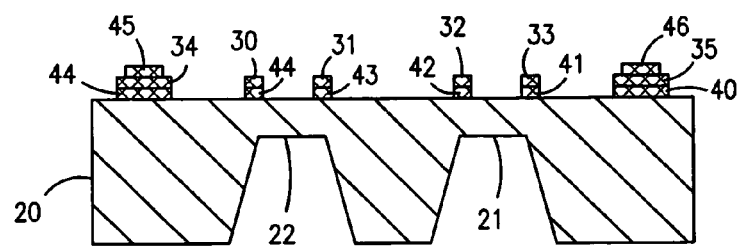
FIG. 5 shows the final configuration of a pressure transducer according to an embodiment of the present invention.

Referring to FIG. 5, there is shown a completed transducer assembly. As one can ascertain from FIG. 5, there is shown a silicon carbide structure 20 which has deflection regions 21 and 22. Positioned above the deflecting regions are piezoresistive sensors which are silicon carbide devices as for example 3C highly doped silicon carbide piezoresistors. Each piezoresistor element as 30, 31, 32 and 33 is bonded to the top surface of the wafer 20 by means of a glass bond as 44, 43, 42 and 41. In a similar manner, the contact areas 34 and 35 are also bonded to the silicon carbide wafer by means of glass bonds 40 and 44. Each contact area has deposited thereon a metal contact surface 45 and 46 to enable exact contact to the structures. The contact areas may be highly doped silicon carbide having deposited thereon metallized contact pads 45 and 46. Thus, FIG. 5 shows a completed wafer.

One skilled in the art will conceive many alternate embodiments which are all deemed to be encompassed within the spirit and scope of the claims appended hereto.

What is claimed is:

1. A high temperature pressure transducer, comprising:
   a wafer of silicon carbide having a top and a bottom surface and having at least one recess formed in said bottom surface to provide a thin area operative as a deflecting diaphragm,
   at least one piezoresistive sensor fabricated from silicon carbide and glass bonded to said top surface of said wafer of silicon carbide overlaying said thin area and dielectrically isolate said sensor from said wafer, wherein said sensor varies a resistance when a force applied to said thin area causes a deflection.

2. The pressure transducer according to claim 1, wherein said wafer of silicon carbide is poly crystalline silicon carbide.

3. The pressure transducer according to claim 1, wherein said wafer of silicon carbide is single silicon carbide.

4. The pressure transducer according to claim 1, wherein said wafer of silicon carbide is selected from 6H, 4H, 3C silicon carbide.

5. The pressure transducer according to claim 1, wherein said sensor is fabricated from 3C silicon carbide.

6. The pressure transducer according to claim 5, wherein said 3C silicon carbide is N-doped silicon carbide.

7. The pressure transducer according to claim 1, wherein said glass bond is a pyroceram bond.

8. The pressure transducer according to claim 1 further including more than one piezoresistor glass bonded to said wafer and interconnected to form a Wheatstone bridge.

9. The pressure transducer according to claim 8, further including contact areas fabricated on said top surface of said wafer and connected to said Wheatstone bridge.

10. The pressure transducer according to claim 7, wherein said pyroceram is a high temperature glass frit bond.

* * * * *